United States Patent [19]
Duncan

[11] 4,313,626
[45] Feb. 2, 1982

[54] COUPLING ARRANGEMENTS

[75] Inventor: William C. W. Duncan, Bugbrooke, England

[73] Assignee: Plessey Handel und Investments AG, Zug, Switzerland

[21] Appl. No.: 109,102

[22] Filed: Feb. 2, 1980

[30] Foreign Application Priority Data

Jan. 5, 1979 [GB] United Kingdom ............... 00329/79

[51] Int. Cl.³ ............................................. F16L 21/08
[52] U.S. Cl. ..................................... 285/86; 285/316; 285/402
[58] Field of Search ................... 285/33, 86, 308, 316, 285/360, 361, 362, 376, 377, 401, 402

[56] References Cited

U.S. PATENT DOCUMENTS

| | | | |
|---|---|---|---|
| 1,871,370 | 8/1932 | Jacques | 285/361 X |
| 2,076,918 | 4/1937 | Robison | 285/396 X |
| 2,795,438 | 6/1957 | Oetiker | 285/33 |
| 3,104,896 | 9/1963 | Kennedy | 285/361 X |

FOREIGN PATENT DOCUMENTS

| | | | |
|---|---|---|---|
| 1526167 | 4/1968 | France | 285/86 |
| 931498 | 7/1963 | United Kingdom | 285/33 |

Primary Examiner—Dave W. Arola
Attorney, Agent, or Firm—Fleit & Jacobson

[57] ABSTRACT

A coupling arrangement consists of two cylindrical parts, a shell having three radially extending projections and a track part having three helical tracks on its internal surface for the reception of the projections. Each track is provided with a locking member consisting of a rotatable pin having a recess. The projections enter the recesses on relative rotation of the two parts and are retained in this position by a compression spring which tends to urge the two parts apart and hold the projections in the recesses. The parts can be separated by compressing the spring and relatively rotating the parts in the opposite direction, or a sleeve surrounding the track part, which normally prevents rotation of the pins, can be moved axially on the track part to allow the pins to rotate and permit the shell and its projections to be withdrawn axially from the track part.

8 Claims, 4 Drawing Figures

COUPLING ARRANGEMENTS

This invention relates to coupling arrangements of the so-called bayonet type in which one of the parts to be coupled is of cylindrical form including a plurality of short radially-extending coupling pins whilst the other part which is also of cylindrical form is provided with a plurality of helical tracks for slidingly receiving the respective coupling pins of the first-mentioned part as the latter is inserted into the other part and rotated relatively thereto. During a coupling operation the coupling pins move along their respective helical tracks to positions at which the pins are lockingly received by pin locking means associated with the said other coupling part whereby the two coupling parts are locked together as regards axial movement and are thereafter separable in response to a positive rotational de-coupling operation. It is also known to provide means for affording rapid release of the coupled parts in the axial direction but such means have the disadvantage of being rather complex and consequentially relatively expensive, as well as lacking the desirable degree of reliability.

According to the present invention therefore, there is provided a simplified form of coupling arrangement of the bayonet type referred to above, in which that part of the coupling arrangement provided with a plurality of helical tracks (hereinafter referred to as the track part) is provided at pin locking locations along said helical tracks with rotatably mounted pin locking members which are constructed so that in a first angular position thereof they lockingly receive the respective coupling pins as the two coupling parts are rotated relatively to one another into a locked condition whereas in a second angular position of the pin locking members to which the latter rotate responsively to axial movement of a coupling release sleeve associated with the track part the aforesaid coupling pins can then move directly from the pin locking members in the axial direction of the coupled parts so as to afford instant separation or release of the two coupled parts.

In carrying out the present invention, the pin locking members of the coupling arrangement may comprise cylindrical body parts which are rotatably accommodated in respective holes extending through the cylindrical wall of the track part and partially circular and partially rectangular head parts which are received respectively in suitably-shaped recesses or openings in the axially slidable sleeve fitted over the track part of the coupling arrangement. The ends of the pin locking members remote from the head parts thereof are formed with open-sided recesses located substantially in the same planes as the coupling pin tracks so that as the two coupling parts are rotated into locking engagement as aforesaid the coupling pins move along the tracks until they enter the open-sided recesses. Towards the end of this rotational movement between the coupling parts spring biasing means acting in the axial direction of the coupling parts becomes effective to exert pressure tending to separate the coupling parts in the axial direction so that when the coupling pins actually enter the recesses in the pin locking members and the two coupling parts released the spring biasing means causes the pins to bear against the side walls of the recesses tending to rotate the locking members. However, these locking members are held against rotation by their circular rectangular heads which are lockingly engaged by the aforesaid release sleeve. The two coupling parts may thereafter be released by positive relative rotation between the two coupled parts, but in accordance with the present invention the two parts may be instantly separated in the axial direction by sliding the release sleeve on the track part so that the heads of the pin locking members can then rotate through a relatively small angle under the action of the aforesaid biasing spring means acting through the coupling pins so that the latter can then pass out of the open sided recesses to provide instant separation of the coupling parts.

The release sleeve may be slidably attached to the track part by means of radially extending pins on the track part engaging axially extending slots in the release sleeve. The sleeve may be biased by spring means to a normal position thereof at which the pin locking members are locked against rotation, so that the sleeve automatically restores to its normal position after sliding movement thereof to effect separation of the coupling parts as described above.

As will readily be appreciated from the foregoing, the coupling arrangement according to the invention is extremely simple and may be used advantageously in applications where the instant release of the coupled parts of electrical connectors is required, as for example in the jettisoning of auxiliary aircraft fuel tanks embodying electrically powered fuel pumps energised through such connectors, and where this release needs to be facilitated in response to a pulling force exerted on one of the coupling parts of the connector coupling arrangement.

By way of example the present invention will now be described with reference to the accompanying drawings in which.

The coupling arrangement which is of the bayonet type comprises two connectable parts and is intended for use with a two part electrical connector (not shown) consisting of for example, a pin assembly and a socket assembly.

Figure 1:
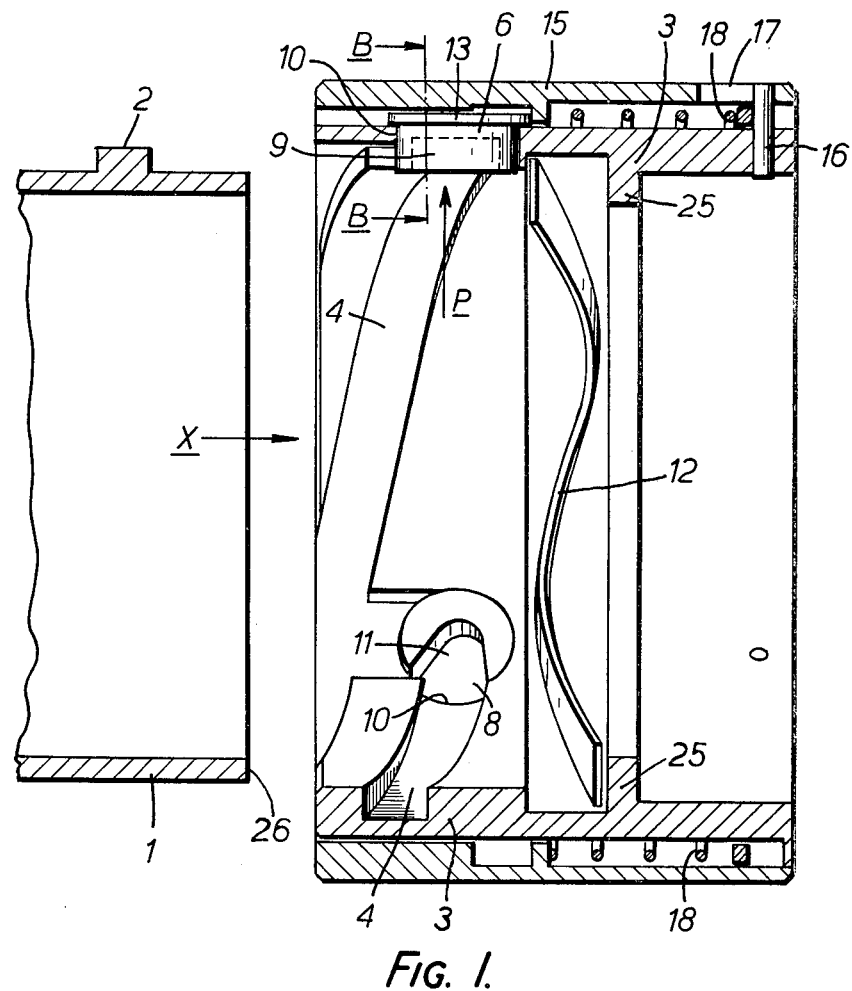
FIG. 1 is an axial cross-sectional view of two coupling parts for a bayonet-type coupling arrangement according to the present invention.
Figure 2:
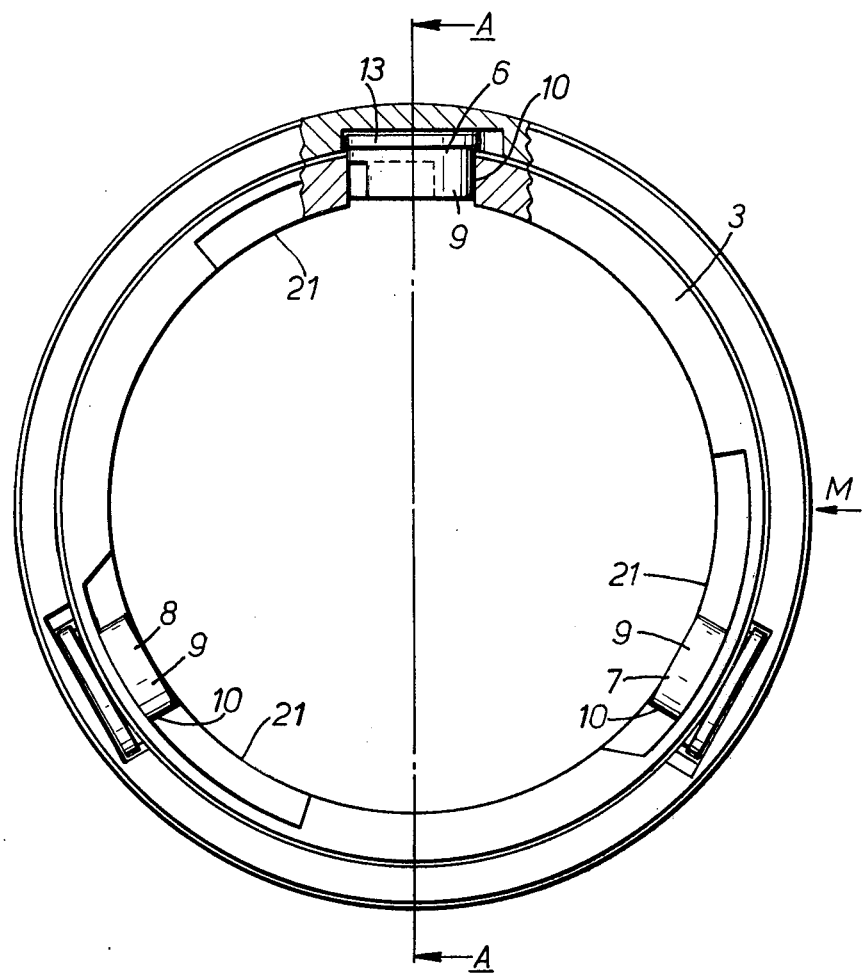
FIG. 2 is an end view of one of the coupling parts taken in the direction X in FIG. 1 and includes a fragmentary sectional view taken along the line B—B in FIG. 1 which is itself a sectional view taken along the line A—A of FIG. 2.
Figure 3:
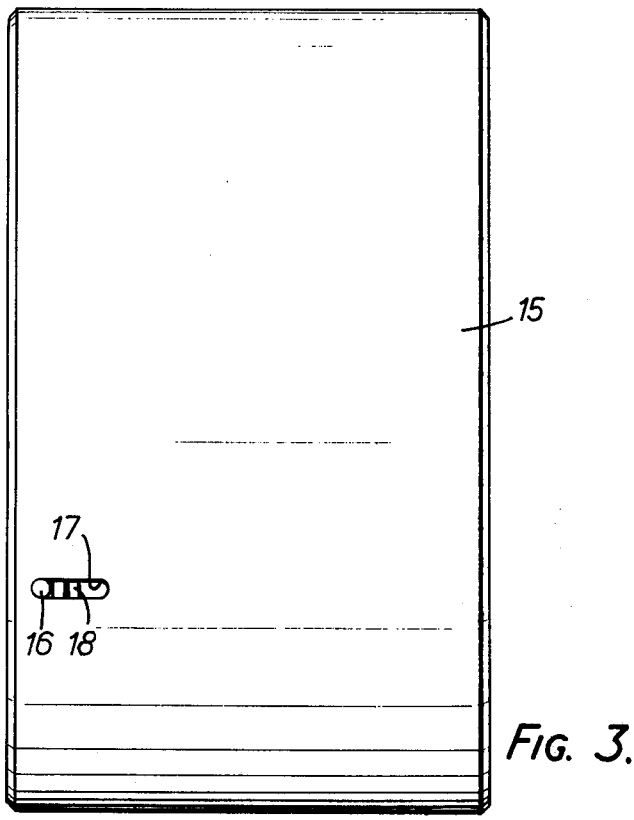
FIG. 3 is a side view of the coupling part shown in FIG. 2 taken in the direction M, and, FIG. 4 is an enlarged diagrommatic view of a pin locking member and associated locking means as viewed in direction P in FIG. 1.

One of the parts of the coupling arrangement consists of a hollow cylindrical shell 1 which is adapted to contain one part of the electrical connector, e.g. the pin assembly. The outer surface of the shell 1 is provided with three radially extending projections 2 equally spaced around the periphery of the shell 1, one of which is shown in FIG. 1.

The other part of the coupling arrangement comprises a track part 3 which also consists of a hollow cylindrical shell adapted to contain the other part of the electrical connector, e.g. the socket assembly. On the inner surface of the track part 3 are formed three helical tracks 4, only two of which are shown in FIG. 1. The three tracks 4 are adapted to receive the projections 2 when the shell 1 is inserted into the track part 3 and the shell 1 and the track part 3 are relatively rotated after the pin assembly and the socket assembly of the electrical connector have been partially interconnected.

Further relative rotation causes the projections 2 to move around the tracks 4 until they reach locking members 6, 7 and 8, one locking member being located in each of the tracks 4. Each locking member 6, 7 or 8 comprises a short rotatable cylindrical body 9 which extends through a hole 10 formed in the shell 3, the body 9 being provided with a generally V shaped open sided recess 11 which normally faces in the direction of its respective track 4 and which is slightly wider than its respective track.

An annular spring 12 is located within the track part 3 and this is located against a shoulder 25 formed on the track part 3. As the shell 1 and the track part 3 are further relatively rotated the spring 12 contacts the end 26 of the shell 1 thus biassing the two parts away from one another. When the projections 2 enter the recesses 11, the biassing force will cause each of the projections 2 to take up a position shown in solid lines in FIG. 4 in which the projection 2 is displaced towards one side of the track 4. With the projections 2 in this position the shell 1 and the track part 3 cannot readily be relatively rotated in either direction and the coupling arrangement is locked.

If axial pressure is exerted on the shell 1 and the track part 3 to overcome the biassing force of the spring 12 the projections 2 will be moved back into line with the tracks 4 and the shell 1 and track part 3 can be separated by opposite relative rotation of the parts 1 and 3. Thus a positive release pressure needs to be exerted on the coupling arrangement before the two parts can be separated.

Surrounding the track part 3 is a sleeve 15 which is axially slidable but prevented from rotation on the track part 3 by means of three pins 16, one of which is shown in FIG. 1. The pins 16 are secured to the track part 3 and extend radially through axially extending slots 17, only one of which again is shown in FIG. 1. A coiled compression spring 18 located in an annular cavity between the sleeve 15 and the track part 3 urges the sleeve 15 into the position shown in FIG. 1.

On the inner surface of the sleeve 15 are formed three shallow grooves 21, which at their ends are reduced in width by walls 19 and 20. The locking members 6, 7 and 8 are formed with part circular and part rectangular heads 13 and these heads 13 are located between the walls 19 and 20 when the sleeve 15 is in the position shown in FIG. 1. In this position of the sleeve 15 each of the locking members is prevented from rotating by the walls 19 and 20 (see FIG. 4) but the spring 12 produces a force between each of the projections 2 and the appertaining wall of the recess 11 tending to rotate each locking member 6, 7 and 8 in a clockwise direction as viewed in FIG. 4.

Figure 4:
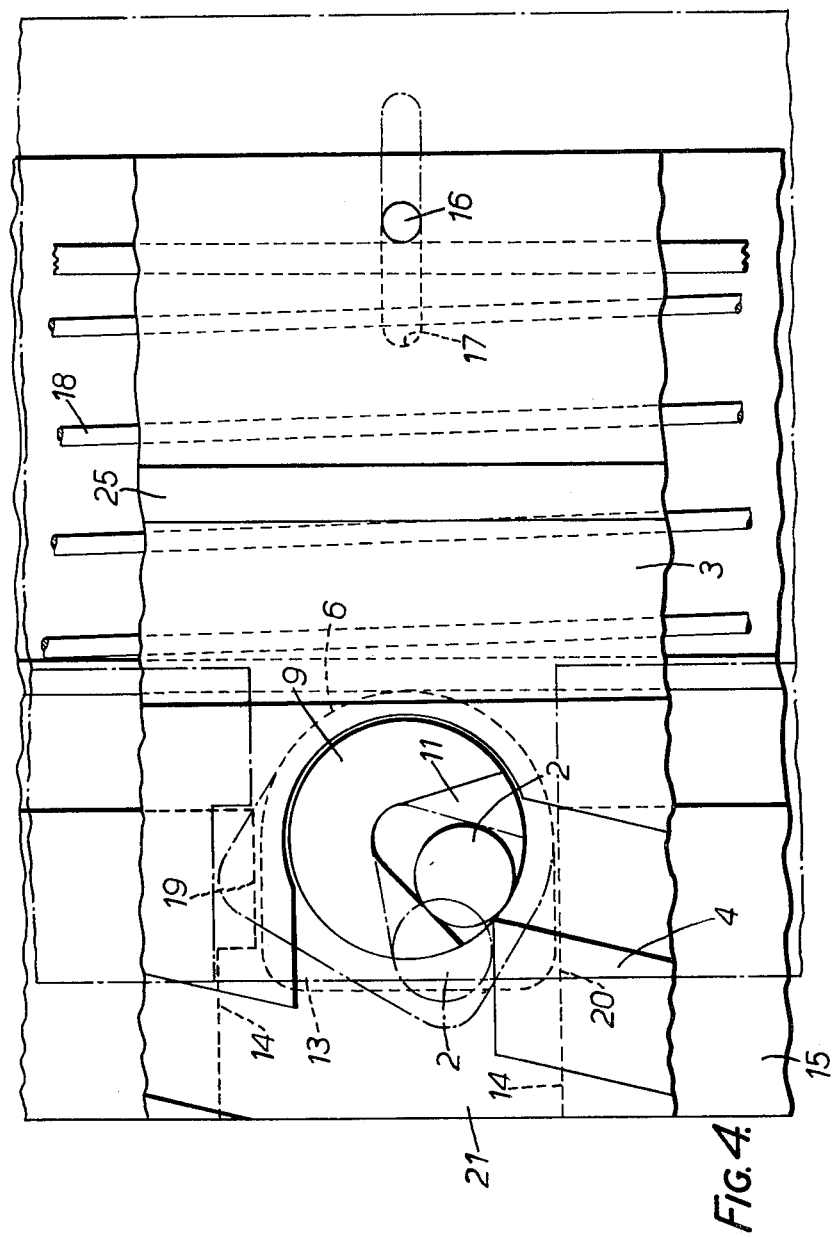

Consequently, by manually displacing the release sleeve 15 to the right, as viewed both in FIGS. 1 and 4, against the action of the bias spring 18 so that the sleeve 15 takes up the dotted line position shown in FIG. 4, the pins 16 engage the other ends of the slots 17 and the heads 13 of the locking members 6, 7 and 8 are no longer held in position between the parallel walls 19 and 20 of the sleeve groove 14. As a consequence, the locking members 6, 7 and 8 will rotate under the action of the spring 12 acting on the end 26 of the shell 1 and hence the projections 2 to the dotted line position indicated for member 6 in FIG. 4. In this position the projections 2 can then move axially along the grooves 21 in the sleeve 15 so that the two parts of the coupling arrangement are physically separated. The release sleeve 15 may then be allowed to restore itself to its normal position under the action of the biasing spring 18 so that the locking members 6, 7 and 8 are rotated back to the projection locking positions.

As will readily be understood from the foregoing description of one embodiment the present invention provides in a coupling arrangement of the bayonet type a very simple and yet effective means of facilitating instant separation between the coupled parts in the axial direction of the parts. The displacement of the release sleeve 15 could be produced pneumatically or hydraulically for example. When applied to electrical connectors the two connector parts may be separated simply by exerting an axial (pulling) force on the release sleeve so that the connector parts can then be pulled apart. In applying the invention to aircraft for example, the electrical connectors may be interposed between the aircraft body and releasable auxiliary fuel tanks and utilized inter alia for supplying electrical power to fuel pumps embodied within the fuel tank structures. When the fuel tanks are jettisoned as by an explosive charge being fired, it may be arranged that the release sleeves 15 of coupling arrangements according to the present invention associated with the electrical connectors are pulled by suitable lanyards so that the jettisoned fuel tanks can then simply pull the electrical connectors apart as they are blown away from the aircraft.

It will be understood that the rotatable locking members 6, 7 and 8 and the number thereof could obviously be varied to produce the same action as described above in the examplary embodiment without departing from the concept of the present invention. The essential feature is that the projections 2 of the shell 1 are moved from a locked position in the track part to a position at which they become physically separated in response to rotation of the locking members 6, 7 and 8 produced as result of axial movement of the release sleeve 15 on the tracked part 3.

What we claim is:

1. A coupling member for a bayonet type coupling arrangement comprising a hollow cylindrical body, said hollow cylindrical body having a plurality of helical tracks formed on its inner surface for slidingly receiving coupling pins projecting from the outer surface of another cylindrical body when said other cylindrical body is inserted into said hollow cylindrical body, said hollow cylindrical body also having a plurality of axially extending tracks formed on its inner surface, each axially extending track intersecting one of said helical tracks, a plurality of locking members mounted in said hollow cylindrical body, one said locking member being positioned at each intersection between a helical track and an axial track, each said locking member having a coupling pin receiving recess and being rotatable between a first angular position in which said recess is aligned with said helical track and a second angular position in which said recess is aligned with said axial track, whereby when said locking members are in said first angular position said coupling pins of said other cylindrical body can only enter said recesses from said helical tracks, and when said locking members are in said second angular position said coupling pins of said other cylindrical body can only be removed from said recesses along said axial tracks, and retaining means for retaining said locking members in said first angular position and for permitting said locking members to rotate to said second angular position.

2. A coupling member as claimed in claim 1 wherein said locking members comprise cylindrical body parts extending through holes formed through said hollow cylindrical body.

3. A coupling member as claimed in claim 2 wherein said retaining means comprises an annular sleeve axially slidably mounted on said hollow cylindrical body and engageable with the outer ends of said cylindrical body parts.

4. A coupling member as claimed in claim 3 wherein said outer ends of said cylindrical body parts comprise partially circular and partially rectangular head parts, and wherein the inner surface of said annular sleeve has shaped openings for receiving said head parts, whereby when said annular sleeve is in a first axial position relative to said hollow cylindrical body said openings contact said rectangular portions of said head parts preventing rotation thereof, and said locking members are retained in said first angular position, and when said annular sleeve is in a second axial position relative to said hollow cylindrical body said head parts can rotate in said openings and said locking members can rotate into said second angular position.

5. A coupling member as claimed in claim 1 comprising spring biassing means located within said hollow cylindrical body, said spring biassing means acting in an axial direction for engagement with said other cylindrical body when said other cylindrical body is inserted into said hollow cylindrical body for a predetermined distance, said spring biassing means tending to separate said two cylindrical bodies.

6. A coupling member as claimed in claim 5 wherein said coupling pin receiving recesses in said locking members are wider than said helical passages, whereby when a coupling pin enters one of said recesses said spring biassing means causes said coupling pin to bear against one side of said recess such that it is out of alignment with said helical track and said other body is locked within said hollow cylindrical body.

7. A coupling member as claimed in claim 4 wherein said annular sleeve is attached to said hollow cylindrical body by means of radially extending pins, said radially extending pins being secured to said hollow cylindrical body and passing through axially extending slots formed in said annular sleeve.

8. A coupling member as claimed in claim 7 wherein said annular sleeve is biassed by spring means into said first axial position and said annular sleeve is further urged against said spring means when in said second axial position such that the annular sleeve automatically returns to its first axial position and returns said locking members to their first angular positions when said annular sleeve is released from its second axial position.

* * * * *